Jan. 27, 1970     HIROSHI USAMI ET AL     3,492,552
DIGITAL CONTROL SYSTEM FOR TOOLS IN THREE AXES OF OPERATION
Filed Sept. 26, 1967     5 Sheets-Sheet 1
FIG.1
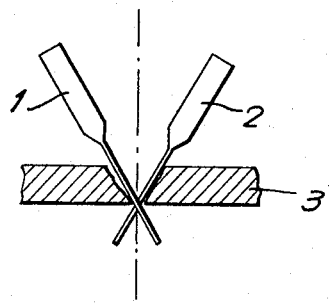
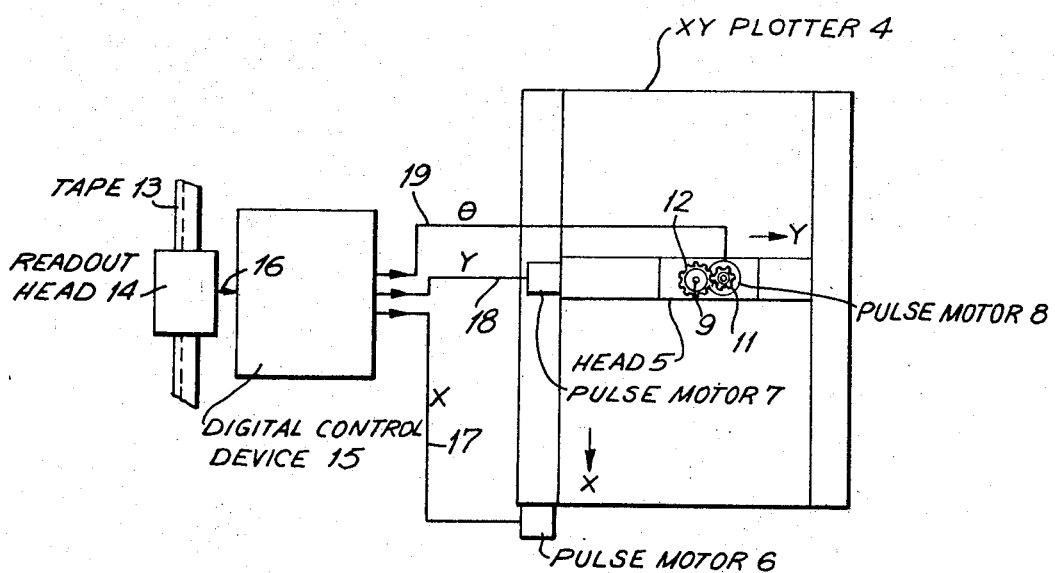
FIG.2

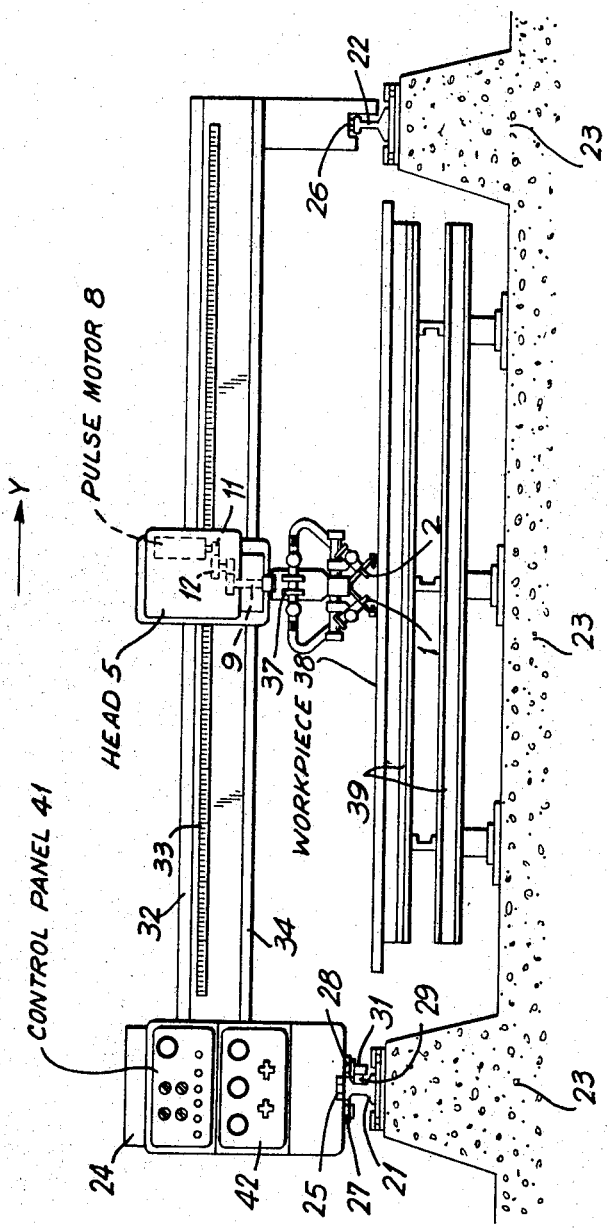

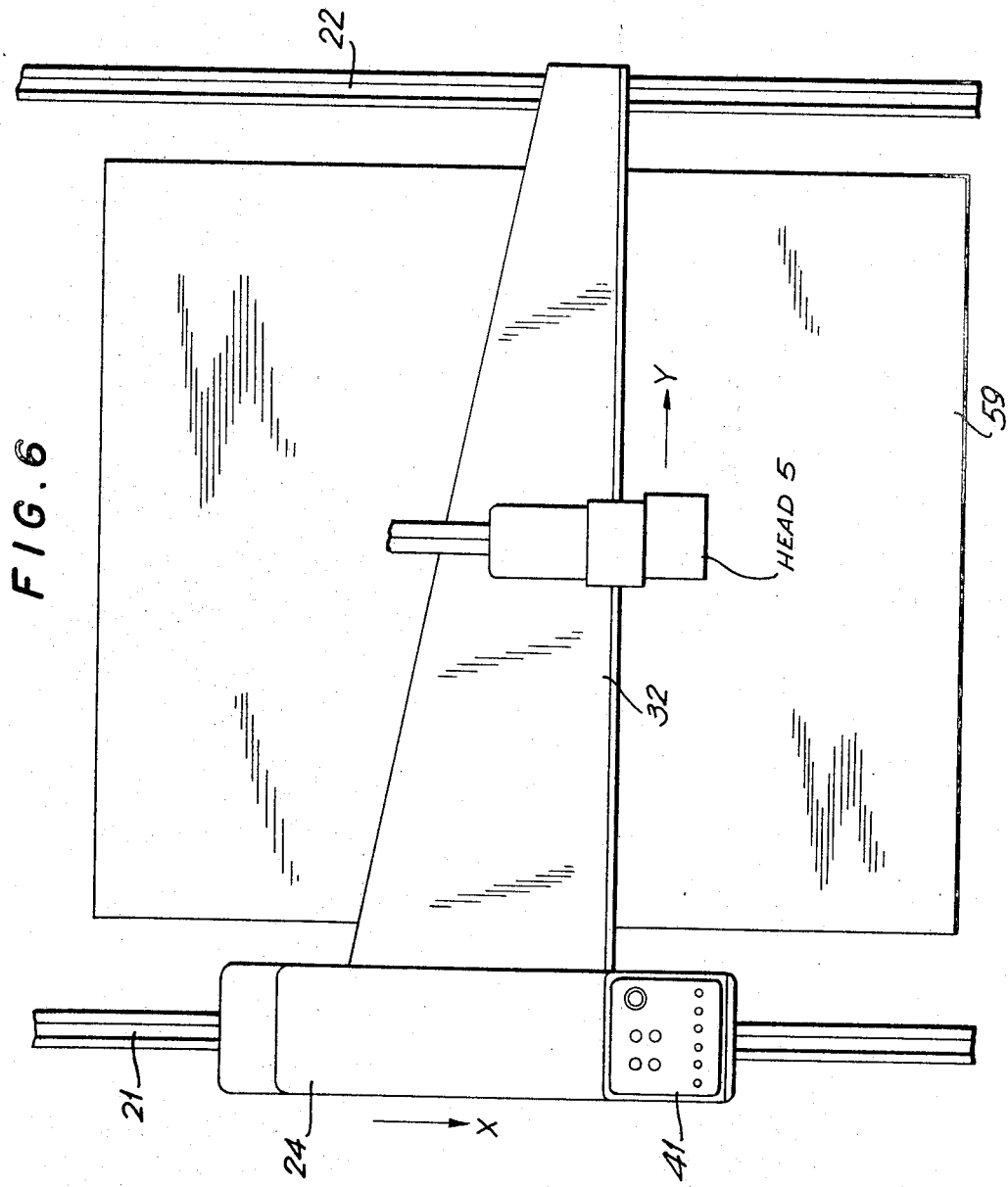

United States Patent Office 3,492,552
Patented Jan. 27, 1970

3,492,552
DIGITAL CONTROL SYSTEM FOR TOOLS IN
THREE AXES OF OPERATION
Hiroshi Usami and Kengo Kobayashi, Kawasaki-shi, Japan, assignors to Fujitsu Limited, Kawasaki, Japan, a Japanese corporation
Filed Sept. 26, 1967, Ser. No. 670,582
Claims priority, application Japan, Sept. 29, 1966, 41/64,221
Int. Cl. G05b *11/01*
U.S. Cl. 318—18
7 Claims

ABSTRACT OF THE DISCLOSURE

A tool support is movably mounted for movement in at least three axes, one of the axes being an axis of rotation. The tool support is moved by a digital control in response to taped instructions in a designated manner in the plane of a workpiece in linear increments joined in polygonal configuration in directions along two of the axes and is rotated at each intersection of linear increments about the third of the axes in designated angles between intersecting linear increments.

DESCRIPTION OF THE INVENTION

The present invention relates to a digital control system. More particularly, the invention relates to a digital control system for tools in three axes of operation.

A digital control system may control the positioning of any suitable tool or plurality of tools such as, for example torches fueled by gas. It is desirable that the plane including the tools be maintained in a position substantially perpendicular to the cutting direction of the workpiece if precision is to be maintained in the tool operation. That is, the tool support should be maintained in a position wherein the plane including the gas-fueled torches are maintained substantially perpendicular to the cutting direction of the workpiece.

The principal object of the present invention is to provide a new and improved digital control system. The digital control system of the present invention maintains a tool or plurality of tools in any desired position relative to the plane of the workpiece. The digital control system of the present invention controls the positioning of tools in three axes of operation with efficiency, effectiveness and reliability. The digital control system of the present invention is a simple structure but precise in operation.

In accordance with the present invention, a digital control system comprises a digital control having at least three outputs for providing controls in at least three axes by providing in response to taped instructions three axis control signals corresponding to three axes each at a corresponding one of the outputs. A tool support supports tools for operation in the plane of a workpiece adjacent the tool support. Mounting apparatus is coupled to the tool support for movably mounting the tool support for movement in at least three axes, one of the axes being an axis of rotation. A coupling couples the outputs of the digital control to the mounting apparatus whereby in response to the taped instructions the tool support is moved in a designated manner in the plane of the workpiece in substantially linear increments in directions along two of the axes and is rotated between the linear increments about the third of the axes in designated angles.

The axis of rotation is transverse to the other axes and to the plane of the workpiece and the first and second of the axes are coordinates at right angles to each other. The tool support is moved in a designated manner in the plane of the workpiece in substantially linear increments joined in polygonal configuration and is rotated at each intersection of linear increments about the third of the axes in designated angles. The angle of rotation of the tool support about the third of the axes is between intersecting linear increments.

In order that the present invention may be readily carried into effect, it will now be described with reference to the accompanying drawings, wherein:

FIG. 1 is a schematic view showing a pair of tools relative to a workpiece;

FIG. 2 is a block diagram of an embodiment of the digital control system of the present invention;

FIG. 5 is a front view of the embodiment of the digital control system of the present invention shown in block form in FIG. 2;

FIG. 6 is a top view of the embodiment of FIG. 5;

Figure 3:
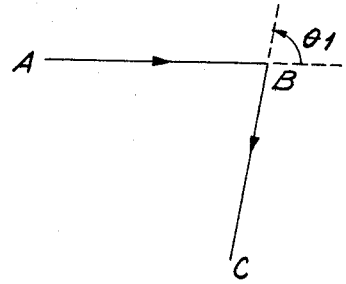
FIG. 3 is a presentation of a pair of linear increments and the angle between them, as formed in the plane of the workpiece by a tool or tools controlled by the digital control system of the present invention.

In the figures, the same components are indicated by the same reference numerals. FIG. 1 illustrates a pair of tools comprising gas-fueled torches such as, for example, oxyacetylene torches, as they are positioned when they are utilized to cut a beveled channel in a workpiece. The first and second tools or torches 1 and 2 are positioned at right angles with the direction of cutting of the workpiece 3. The first and second tools 1 and 2 are maintained continuously at right angles with the direction of cutting of the workpiece 3.

In FIG. 2, which is an embodiment of the digital control system of the present invention, a two coordinate or XY plotter 4 of known type is utilized to control a head 5 in position along the X axis and along the Y axis. The head 5 is moved in directions along the X axis by a pulse motor 6 and is moved in directions along the Y axis by a pulse motor 7. The head 5 is provided with a pulse motor 8 which is mounted thereon and which rotates a head shaft 9 via a pair of gears or any suitable gear train 11 and 12.

A tape 13 is provided for controlling the operation of the digital control system of the present invention. The tape 13 stores instructions for the positioning of the tools supported by the head 5. The instructions are stored on the tape 13 in any suitable manner such as, for example, magnetic recording or perforations through the tape. For the purpose of illustration, it is assumed that the instructions are perforated in the tape 13. A readout head 14 is positioned in operative proximity with the tape 13 and reads out the instructions recorded therein. The read out instructions from the tape are supplied by the readout head 14 to a digital control device 15 via a lead 16.

The digital control device 15 comprises any suitable known digital control device for translating and transferring electrical control signals. A suitable digital control device may comprise, for example, that described in "Control Engineering," January 1961, pp. 71–73. The control signals or pulses provided at the outputs of the digital control device 15 are connected via leads 17, 18 and 19 to the pulse motors 6, 7 and 8, respectively.

The control pulses supplied to the pulse motor 6 via the lead 17 from the digital control device 15 move the head 5 in directions along the X axis. The control pulses supplied to the pulse motor 7 via the lead 18 from the digital control device 15 move the head 5 in directions along the Y axis. The control pulses supplied to the pulse motor 8 via the lead 19 from the digital control device 15 rotate the shaft 9 in accordance with the instructions in the tape. Thus, the instructions for the positioning of the head 5 along the X and Y axes and for the rotation of the shaft 9, as recorded in the tape 13, are utilized to position said head as desired in the plane of a workpiece (not shown in FIG. 2). This is accomplished by the digital control device 15 which functions to provide linear interpolations simultaneously in three axes.

FIG. 3 shows a pair of intersecting linear increments traced by a tool or tools controlled in position by the digital control system of the present invention. The tool or tools supported by the head 5 (FIG. 2) move in a polygonal configuration. One segment of the polygonal configuration is the linear increment AB of FIG. 3 and another segment of the polygonal configuration is the linear increment BC. At the point of intersection of the linear segments AB and BC, the head 5 (FIG. 2) is stationary for an instant, and, while it is stationary, is rotated about the third axis, which is transverse to the axes X and Y in accordance with the instructions supplied via the lead 19 (FIG. 2). The angle of rotation of the head 5, and therefore the tool or tools supported by said head, is $\theta_1$ and is the angle between the linear increments AB and BC.

Figure 4:
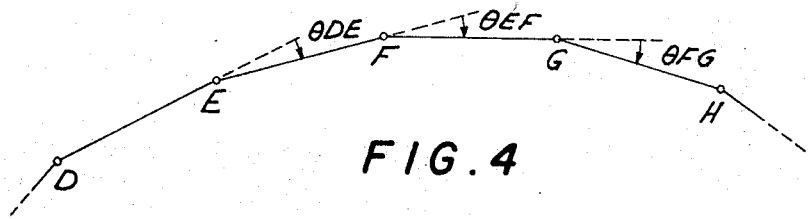
FIG. 4 is a presentation of a plurality of linear increments and the angles between them, as formed in polygonal configuration in the plane of the workpiece by a tool or tools controlled by the digital control system of the present invention.

In FIG. 4, a plurality of linear increments DE, EF, FG and GH of a polygonal configuration traced in the plane of the workpiece (not shown) by the tool or tools supported by the head 5 (FIG. 2) are shown. At each intersection of adjacent intersecting linear increments, the shaft 9, in a manner hereinafter described, rotates the tool or tools through an angle designated by the control pulse in the lead 19. Each angle of rotation of the tool or tools is between the intersecting linear increments. The shaft 9, and therefore the tool or tools, is gradually rotated through an angle $\theta DE$ as the tool or tools moves from the point of intersection E to the point of intersection F along the linear increment EF. The shaft 9, and therefore the tool or tools, gradually moves through an angle $\theta EF$ as the tool or tools moves from the point of intersection F to the point of intersection G along the linear increment FG. The shaft 9 gradually rotates through an angle $\theta FG$ as the tools move from the point of intersection G to the point of intersection H along the linear increment GH. The angle $\theta DE$ is between the linear increments DE and EF. The angle $\theta EF$ is between the linear increments EF and FG. The angle $\theta FG$ is between the linear increments FG and GH.

The instructions for the angle of rotation of the tool or tools at each point of intersection of linear increments are readily determined by a computer and are therefore readily stored in the tape 13 of FIG. 2. This enables the positioning of the tool or tools by the digital control system of the present invention about an angle which utilizes the third axis as the axis of rotation. The third axis, being somewhat akin to the Z axis, is transverse to the axes X and Y.

Figure 7:
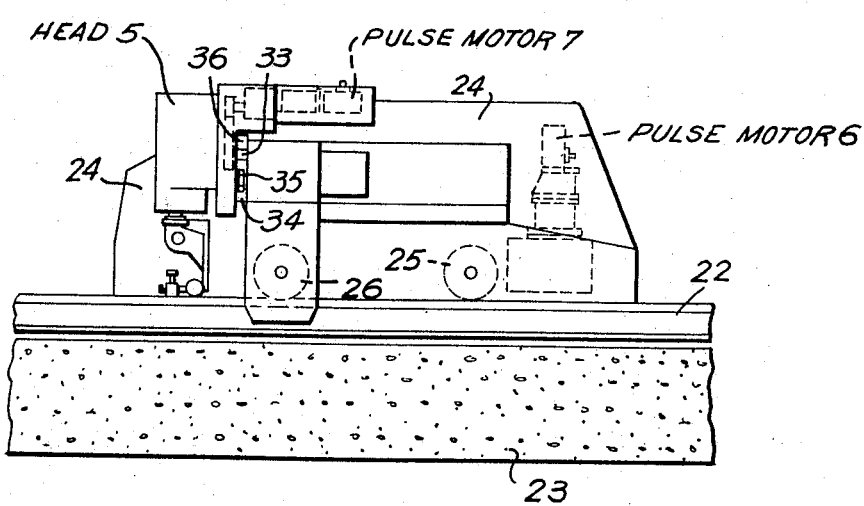
FIG. 7 is a side view of the embodiment of FIG. 5.

FIGS. 5, 6 and 7 disclose the details of the mechanical structure of the pulse distribution system of the present invention. In FIGS. 5, 6 and 7, most evident in FIG. 5, the digital control system structure is shown to comprise a pair of spaced parallel rails 21 and 22 supported on a suitable base structure 23 comprising concrete or the like. A carriage 24 is mounted for rotation along the rails 21 and 22 by rollers 25, 26, 27 and 28. A rack 29 is provided in parallel with the rail 21 and extends along said rail. The rack 29 is engaged by a pinion 31 which is driven by the pulse motor 6 (FIG. 7). The pulse motor 6, first described with reference to FIG. 2, is mounted on the carriage 24. The pulse motor 6, as well as the pulse motor 7, preferably comprises an electrohydraulic motor.

An arm 32 is affixed to or integrally formed with the carriage 24 and extends from said carriage to the rail 22. The head 5 supports one or more tools such as, for example, gas-fueled torches 1 and 2. The torches 1 and 2, or any suitable number of tools or torches, are positioned by the digital control system by positioning of the head 5. The head 5 is movably mounted on the arm 32 for movement in direction along the Y axis. The torches 1 and 2 are positioned in the figures, for the purposes of illustration, to cut a beveled groove or channel in a workpiece (not shown). A rack 33 extends along the arm 32 in the directions of the Y axis and a rail 34 is affixed to the arm 32 in order to hold the head 5 on said arm and to guide said head along said arm.

As most clearly evident in FIG. 7, the head 5 is held and moved along the rail 34 by a roller 35. A pinion 36 is provided on the head 5 and engages the rack 33. The pinion 36 is driven by the pulse motor 7. The pulse motor 7, first described with reference to FIG. 2, is similar to the pulse motor 6 and is mounted on the head 5. The pulse motor 7 drives the pinion 36 via any suitable gear train. The pulse motor 8, first mentioned with reference to FIG. 2, is mounted on the head 5, as described, and may comprise an electric pulse or step motor. The motor 8 rotates the tools or torches 1 and 2 by rotating the head shaft 9.

The tools or torches 1 and 2 are supported by the head 5 via a tool holder 37. The tool holded 37 maintains the tools 1 and 2 in operative proximity with the workpiece 38, which may comprise, for example, a steel or iron plate. The workpiece 38 is supported by a work bench, stand or table 39. The digital control system is controlled in operation by an operator who utilizes a control panel 41 which includes various gas indicators on a gas panel 42 when the tools 1 and 2 are gas-fueled torches of the type described.

In operation, the head 5, which supports the tools 1 and 2 or any suitable number of tools, is moved in directions along the X axis by rotation of the motor 6 (FIGS. 2 and 7). The head 5 is moved in directions along the Y axis by rotation of the motor 7 (FIGS. 2 and 7). Thus, by proper control of the rotation of the motors 6 and 7, the tools 1 and 2 may be moved in a manner whereby they cut a desired configuration out of the workpiece 38 (FIG. 5).

The tool holder 37 is rotated through a desired angle by rotation of the motor 8, as described, since such tool holder rotates with the shaft 9 to which it is affixed. Thus, by proper control of the angle of rotation of the motor 8 the tools 1 and 2 may be maintained perpendicular to the direction of movement of the head 5.

An electrohydraulic pulse motor or electric pulse motor rotates in response to electrical pulses supplied thereto and the output shaft of the motor is rotated through a constant angle and is stopped in position each time a pulse is supplied. This is described, for example, in "Control Engineering," January 1962, pp. 73 to 75. Thus, the angle of rotation of the electrohydraulic or electric pulse motor is proportional to the number of pulses in the input pulse train supplied to said motor. The utilization of electrohydraulic or electric pulse motors in the digital control system of the present invention thus enables the control of the positioning of the tools in the plane of the workpiece and also enables the control of the rotation of the tools, such controls being accomplished by input pulse trains in three axes, the input pulse train of each axis being supplied to a corresponding one of the three motors 6, 7 and 8.

A digital control device which functions to provide linear interpolations simultaneously in three axes is described in U.S. Patents No. 3,069,608 and is also described in "Control Engineering," January 1961, pp. 71 to 73. Such a digital control device may be readily utilized as the digital control device 15 of FIG. 2 and produces three pulse trains, each pulse train being for a corresponding one of the three axes. A three axis or three dimensional linear interpolator has three output terminals. Thus, if three different values such as, for example, XO, YO and $\theta$O are punched in the tape 13 (FIG. 2), the digital control device 15 produces at its output terminals, and therefore in its output leads 17, 18 and 19, pulse trains having pulses which are distributed almost uniformly in time. That is, in a constant period of time, XO pulses may be produced in the output lead 17 (FIG. 2) at a repetition rate or frequency proportional to the numerical value XO. YO pulses may be produced in the output lead 18 (FIG. 2) at a repetition rate or frequency proportional to the numerical value YO. $\theta$O pulses may be produced in the output lead 19 (FIG. 2) at a repetition rate or frequency proportional to the numerical value $\theta$O.

In the disclosed embodiment of the digital control system of the present invention, the desired control is attained by connecting the pulse motor 6, which controls the movement of the tools in X axis directions, to the first output lead 17, connecting the pulse motor 7, which controls the movement of the tools in Y axis directions, to the second output lead 18, and connecting the pulse motor 8, which rotates the tools, to the third output lead 19.

Figure 8:
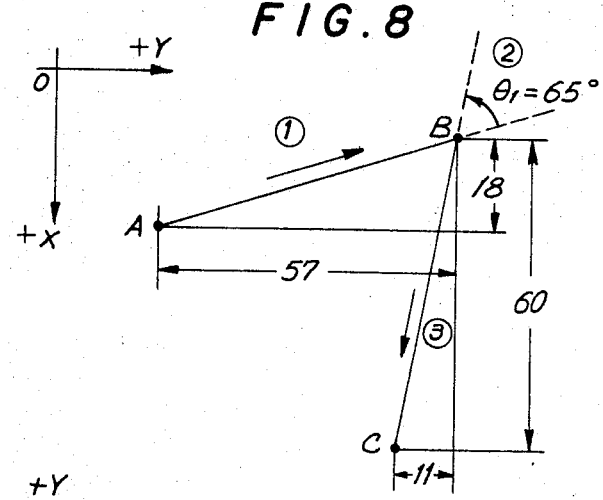
FIG. 8 is a presentation for explaining the operation of the digital control system of the present invention with regard to the presentation of FIG. 3.
Figure 9:
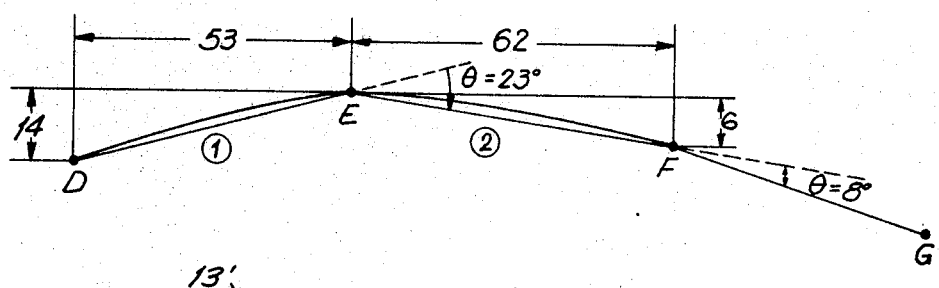
FIG. 9 is a presentation for explaining the operation of the digital control system of the present invention with regard to the presentation of FIG. 4.
Figure 10:
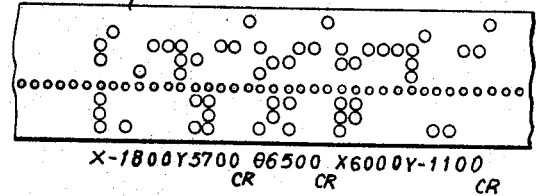
FIG. 10 is a tape perforated with instructions for positioning a tool or tools along the linear increments shown in FIG. 8.
Figure 11:
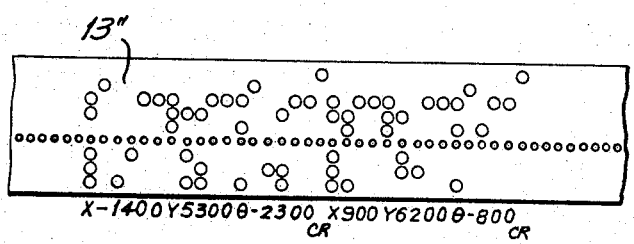
FIG. 11 is a tape perforated with instructions for positioning a tool or tools along the linear increments shown in FIG. 9.

FIGS. 8 and 9 illustrate a method of producing the perforated instruction tapes of FIGS. 10 and 11, respectively. In each of FIGS. 10 and 11, the perforated instruction tape may be utilized as the tape 13 of FIG. 2. The tape 13' of FIG. 10 controls the movement of the tools along linear paths and the tape 13'' of FIG. 11 controls the movement of the tools along curved paths, as illustrated in FIGS. 8 and 9, respectively. The linear increments of each of FIGS. 8 and 9 are those indicated in FIGS. 3 and 4 and are identified in the same manner.

In FIG. 8, linear increments AB and BC are segments of a polygonal configuration which are desired to be cut from the workpiece and along which the tools or torches 1 and 2 are to be moved in the directions of the arrows. If the tools are at the point A and are perpendicular to the linear increment AB, the tabulation indicated in Table I may be provided. In this instance, it is assumed that the tools are moved in directions along the X and Y axes for distance of 0.01 mm. per pulse and that the angle of rotation of the tools is 0.01° per pulse.

TABLE I

| | X | Y | $\theta$ | CR |
|---|---|---|---|---|
| Step: | | | | |
| ① | X 1,800 | Y 5,700 | | CR |
| ② | | | $\theta$ 6,500 | CR |
| ③ | X 6,000 | Y 1,100 | | CR |

As indicated in Table I, in the first step of the operation, in moving from the point A to the point B along the linear increment AB, the tools move 18 mm. in a negative direction along the X axis and 57 mm. in a positive direction along the Y axis, and are not rotated about their Z axis. In step 2, the tools, when momentarily halted in movement at the point B, are rotated through an angle of 65°. Then, in step 3, in moving from point B to point C along the linear increment BC, the tools are moved 60 mm. in a positive direction along the X axis and 11 mm. in a negative direction along the Y axis, and are not rotated. In Table I, as well as in the markings explaining the instructions perforated in the tapes 13' and 13'' of FIGS. 10 and 11, CR indicates an end of instruction and indication of another succeeding instruction.

FIG. 9 illustrates a curve which is desired to be cut from the workpiece. In order to facilitate the cutting of a curve from the workpiece, such curve is divided into a plurality of linear increments DE, EF, FG, and so on. The instructions for movement of the tools are thus in accordance with the short linear increments into which the curve is divided. The process for tracing a curve in the workpiece is tabulated in Table II.

TABLE II

| | X | Y | $\theta$ | CR |
|---|---|---|---|---|
| Step: | | | | |
| ① | X 1,400 | Y 5,300 | $\theta$ 2,300 | CR |
| ② | X 900 | Y 6,200 | $\theta$ 800 | CR |

As indicated in Table II, in step 1, in moving from the point D to the point E along the linear increment DE, the tools are moved along the X axis in a negative direction for a distance of 14 mm., along the Y axis in a positive direction for a distance of 53 mm., and at the point E, said tools are rotated through an angle of 23° in a negative direction. The rotation of the tools through an angle of 23°, enables the tools to be moved in the proper direction during the second step of movement from the point E to the point F along the second linear increment EF. As indicated in Table II, in step 2, the tools are moved 9 mm. in the positive direction along the X axis, 62 mm. in the positive direction along the Y axis, and are rotated through a negative angle of 8° at the point F.

While the invention has been described by means of specific examples and in a specific embodiment, we do not wish to be limited thereto, for obvious modifications will occur to those skilled in the art without departing from the spirit and scope of the invention.

We claim:

1. A digital control system for gas-fueled torches, comprising:
   digital control means having at least three outputs for providing controls in at least three axes by providing in response to taped instructions three axis control signals corresponding to three axes each at a corresponding one of said outputs;
   tool supporting means for supporting gas-fueled torches for operation in the plane of a workpiece adjacent said tool supporting means;
   mounting means coupled to said tool supporting means for movably mounting said tool supporting means for movement in at least three axes, one of said axes being an axis of rotation; and
   coupling means coupling the output of said digital control means to said mounting means whereby in response to said taped instructions and tool supporting means is moved in a designated manner in the plane of the workpiece in substantially linear increments in directions along two of said axes and is rotated between the linear increments about the third of said axes to maintain a perpendicular relation between the plane of said torches and the direction of displacement of said tool supporting means.

2. A digital control system as claimed in claim 1, wherein said axis of rotation is transverse to the other axes and to the plane of the workpiece.

3. A digital control system as claimed in claim 1, wherein the first and second of said axes are coordinates at right angles to each other.

4. A digital control system as claimed in claim 1, wherein said tool supporting means is moved in a designated manner in the plane of the workpiece in substantially linear increments joined in polygonal configuration.

5. A digital control system as claimed in claim 1, wherein said tool supporting means is moved in a designated manner in the plane of the workpiece in substantially linear increments joined in polygonal configuration and is rotated at each intersection of linear increments about the third of said axes in designated angles.

6. A digital control system as claimed in claim 1, wherein said axis of rotation is transverse to the other axes and to the plane of the workpiece and the first and second of said axes are coordinates at right angles to each other.

7. A digital control system as claimed in claim 5, wherein the angle of rotation of said tool supporting means about the third of said axes is between intersecting linear increments.

References Cited

UNITED STATES PATENTS

| | | | |
|---|---|---|---|
| 2,679,620 | 5/1954 | Berry | 318—31 XR |
| 2,996,348 | 8/1961 | Rosenberg | 318—162 XR |
| 3,015,806 | 1/1962 | Wang et al. | 318—162 XR |
| 3,072,833 | 1/1963 | Kerr et al. | 318—19 XR |
| 3,073,998 | 1/1963 | Bower | 318—19 XR |
| 3,394,293 | 7/1968 | Taniguchi et al. | 318—18 |

B. DOBECK, Primary Examiner

U.S. Cl. X.R.

318—28